May 26, 1970 R. M. FORSBERG 3,513,746
ANCHORING FASTENERS
Filed Sept. 9, 1968
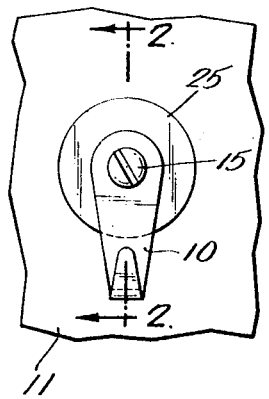
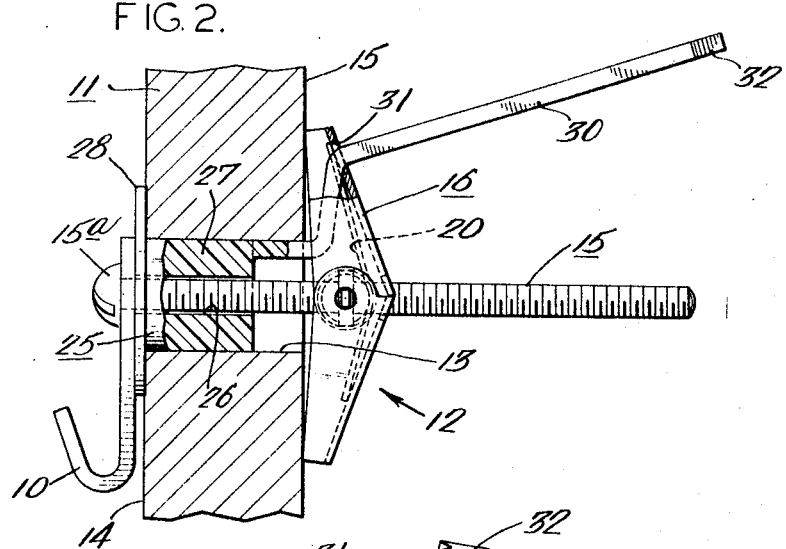
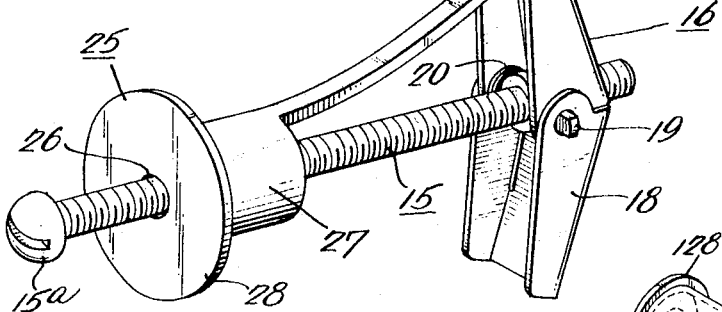
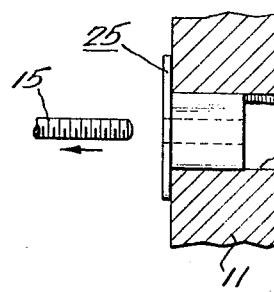
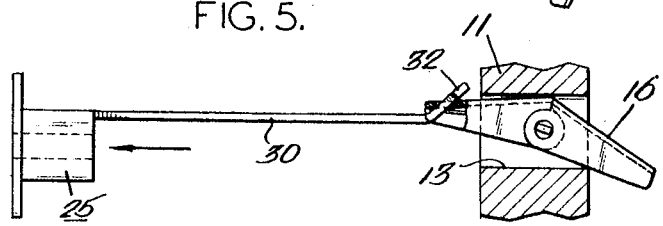
INVENTOR:
RAYNOR MORGAN FORSBERG
BY Howson & Howson
ATTYS.

United States Patent Office 3,513,746
Patented May 26, 1970

3,513,746
ANCHORING FASTENERS
Raynor Morgan Forsberg, 415 S. 25th St.,
South Bend, Ind. 46615
Filed Sept. 9, 1968, Ser. No. 758,437
Int. Cl. F16b 37/00
U.S. Cl. 85—3                                    13 Claims

ABSTRACT OF THE DISCLOSURE

A blind fastener having an anchor disposed behind a wall is provided with a collet disposed on the front of the wall and releasably connected to the anchor by a screw element passing through an aperture in the wall. The anchor and the collet engage respective sides of the the wall when the screw is rotated clockwise, and the anchor disengages the wall and the end of the screw when the screw is rotated counterclockwise; however, the anchor is prevented from falling into an inaccessible location behind the wall by a tether which passes through the aperture and which connects the collet to the anchor. An operator may then withdraw the anchor from behind the wall by pulling frontward on the collet to permit the blind fastener to be reassembled and reused.

---

The present invention relates to fasteners, and more particularly, the present invention relates to fasteners of the expandable-anchor type having an anchor which is tethered to permit its retrieval from behind a wall.

At present, articles such as pictures, mirrors or the like are customarily hung on walls by means of so-called "blind" fasteners or toggle bolts. The conventional blind fastener comprises an anchor dimensioned to pass through a pre-drilled aperture in a wall and a screw element carried by the anchor with its head projecting out of the aperture for engaging an eyehook which supports an article. When in use, the screw is rotated clockwise and the eyehook and anchor are drawn against respective sides of the wall to secure the article to the wall. When the eyehook is permanently attached to the article and it is desired to remove the article from the wall, for example to permit the wall to be painted, the screw is rotated counterclockwise to disengage the eyehook and anchor from their respective sides of the wall.

One of the primary disadvantages of the conventional blind fastener lies in the fact that ordinarily it may be used only once, since when its screw is rotated counterclockwise in removing an article from a wall, the anchor falls away from the end of the screw behind the wall and is lost. Sometimes the blind fastener does not even receive an initial use, as would occur when an operator inadvertently inserts the anchor through a wall-aperture before inserting the screw through the eyehook.

Another disadvantage of the conventional blind fastener is the tendency of its anchor to rotate behind the wall when its screw is rotated in tightening the fastener against the wall. Rotation of the anchor may be prevented however, by rotating the screw while pulling it outwardly from the wall to maintain the anchor in engagement with the inside of the wall. This technique is undesirable when hanging heavy or bulky articles having the eyehook permanently attached thereto, since two workmen may be required, one supporting the article while the other manipulates the blind fastener. In addition, when hanging heavy articles in this manner, it is difficult to center the screw within the aperture so that the anchor engages against an adequate load-bearing surface around the aperture.

In view of the foregoing, it is a primary object of the present invention to provide a novel blind fastener which may be reused a number of times.

It is a further object of the present invention to provide unique means by which the anchor of a blind fastener may be withdrawn from its normal operating position behind a wall to permit the blind fastener to be reassembled and reused.

As a further object, the present invention provides an improved blind fastener having means to prevent its anchor from rotating behind a wall when its cooperating screw is rotated to tighten the fastener against the wall.

More particularly, in the present invention, an article is supported on a wall by a blind fastener having an anchor disposed behind the wall and a collet disposed on the front of the wall, the anchor and collet being connected together by a screw which passes through an aperture in the wall. The anchor is displaced axially on the screw toward the collet when the screw is rotated clockwise, and the anchor is displaced away from the collet and is disconnected from the screw when the screw is rotated counterclockwise. A tether passes through the aperture and interconnects the collet and the anchor so that when the anchor behind the wall is disconnected from the screw, the anchor dangles from the tether to permit its withdrawal through the aperture when the collet is pulled frontward.

In addition to these objects, other objects, features and advantages of the present invention will become apparent from the following description when taken in conjunction with the accompanying drawing in which:

FIG. 1 is a front elevational view of a blind fastener embodying the present invention;

FIG. 2 is an enlarged view taken along line 2—2 of FIG. 1 to illustrate the blind fastener of the present invention in operative engagement with a wall;

FIG. 3 is an enlarged perspective view showing a blind fastener having a collet disposed at the head-end of a screw and an anchor disposed at the tail-end of the screw with a tether extending along the screw and interconnecting the collet and the anchor;

FIG. 4 is a partially sectioned, side elevational view in reduced scale of the fastener of FIGS. 2 and 3 illustrating the anchor dangling from the end of the tether when the screw carrying the anchor is disconnected therefrom and is withdrawn leftward from the collet;

FIG. 5 is a view similar to FIG. 4 illustrating the anchor being withdrawn through a wall-aperture as the collet and tether are displaced leftward; and FIGS. 6 and 7 are perspective views of modified collets and tethers which may be employed in the present invention.

Referring now to the drawings, and more particularly to FIG. 1, there is illustrated an article support or eyehook 10 mounted on a wall 11 by a blind fastener indicated generally at 12 (see FIG. 2). The wall 11 may be of relatively thin sheet material of the type presently in use in "dry-wall" construction having a front side 14 facing the interior of a room for example, and a rear side 15 facing into a blind space. In accordance with conventional practice, the eyehook 10 is located on the front of the wall by an aperture or bore 13 drilled therethrough at substantially right angles to the plane of the wall.

In order to securely clamp the eyehook against the front of the wall, an anchor 16 is disposed behind the wall 11 to span across the aperture 13, and threaded means, in the present instance a screw 15 having a head 15a, projects longitudinally through the aperture 13 interengaging the anchor and the eyehook. As may be seen in FIG. 3, the anchor 16 has a pair of arms 17 and 18 pivotally carried by a yoke 19 threaded onto the screw element 15 with a torsion spring 20 biasing the arms 17 and 18 away from the body of the screw 15 into an extended position as seen in FIGS. 2 and 3. In the present instance, the arms 17 and 18 are generally U-shaped having dimensions which permit them to be folded inwardly against the bias of the spring 20 into an interested relationship enclosing the shaft to provide a slim profile permitting forward insertion through the aperture 13. When the anchor 16 is inserted through the aperture, its arm 17 and 18 spring outwardly and span across the aperture 13 for normally preventing withdrawal of the screw rearwardly therethrough. It is to be noted however, that certain dimensions of the anchor 16 are critical in the present invention. For example, when the arms are folded against the screw, the maximum dimensions of the anchor in a plane normal to the axis of the aperture must be less than the diameter of the aperture so that the anchor may be readily inserted through the aperture; however when the arms are extended the maximum dimensions of the anchor in the same plane must be greater than the diameter of the aperture to prevent the anchor and the screw from being withdrawn through the aperture (see FIG. 2). In addition, when the arms are extended by the spring 20 the maximum dimensions of the anchor in a plane normal to the direction of arm extension must be less than the diameter of the aperture, so that when the anchor is disconnected from the screw in a manner to be described, the anchor may be displaced lengthwise through the aperture (see FIG. 5).

As described thus far, the blind fastener is conventional, comprising an anchor and a screw carried by the anchor for mounting an eyehook, the eyehook and the anchor being drawn together against their respective sides of the wall upon rotation of the screw in the clockwise direction. The hook is removed from the wall when the screw is rotated in the opposite or counterclockwise direction, and the anchor is displaced forwardly along the screw until it is disengaged from the end of the screw to thereby fall into an inaccessible position behind the wall. The screw carrying the hook may thereby be withdrawn through the aperture in the wall; however, the blind fastener is not reusable without its cooperating anchor. Therefore, in accordance with the primary object of the present invention, means is provided to prevent the anchor from being unintentionally disconnected from its cooperating screw to thereby provide a blind fastener which may be reassembled and reused a number of times.

To this end, a collet 25 engages against the front of the wall around the aperture 13 and is prevented from passing through the aperture and behind the wall by an abutment, in the present instance a peripheral flange 28 having a maximum dimension larger than the diameter of the aperture. The collet 25 is centered with respect to the aperture by a cylindrical body portion 27 extending forwardly from the flange 28. A central bore 26 extending axially through the collet 25 centers the screw in the aperture 13 and mounts the screw 15 for rotary and sliding motion therein. Thus, when the screw 15 is rotated in the clockwise direction (FIG. 1) the collet 25 and the anchor 16 are drawn together against their respective opposite sides of the wall 11 and the hook 10 is secured to the front of the wall. When the screw 15 is rotated in the counterclockwise direction, the anchor 16 and the collet 25 are displaced away from their respective sides of the wall, with continued rotation of the screw in this direction causing the anchor to disengage the end of the screw.

According to the present invention however, means is provided to cooperate with the collet for preventing the anchor from being lost behind the wall when it is disengaged from the end of the screw. To this end, a tether 30, in the present instance integral with the body portion 27 of the collet 25, extends forwardly along the screw 15 and interconnects the collet 25 and the anchor 16. The tether 30 is connected to the anchor 16 through an eye 31 in the arm 17 (FIGS. 2 and 3), the eye 31 being dimensioned to permit the tether 30 to slide freely therethrough, so that when the anchor is displaced axially leftward upon clockwise rotation of the screw 15, the tether 30 assumes a storage position as shown in FIG. 2 which is out of the operative path of the anchor. A barbed head 32 having outwardly extending flexible portions is provided on the free end of the tether 30 to give the head 32 a normal transverse dimension which is greater than the dimension of the aperture or eye 31. The flexible portions are resiliently deformable inwardly toward the tether and outwardly therefrom, and they taper forwardly to a point so that when the head 32 is inserted forwardly through the eye 31, each flexible portion is flexed inwardly and then outwardly to engage the arm 17 around the eye 31 for preventing the collet 25 from being disconnected from the anchor when the collet is displaced leftward from the wall. Thus, the tether cooperates with the collet to prevent the anchor from inadvertently being lost behind the wall while permitting the anchor to be withdrawn through the aperture in the wall so that it may be reused.

In use, the hook 10, the collet 25 and the anchor 16 are assembled on the screw 15, and the barbed head 32 of the tether 30 is inserted through the eye 31 in the arm 17 of the anchor 16. The anchor 16 may then be inserted rightward through the wall-aperture 13 with the arms 17 and 18 folding inwardly toward the screw 15 against the bias of the spring 20 until the anchor 16 is clear of the aperture, whereupon the arms 17 and 18 extend (see FIG. 2). The screw 15 is then rotated in the clockwise direction to tighten the collet 25 and the anchor 16 against their respective sides of the wall 11 and to thereby firmly clamp the hook 10 in place.

As may be seen in FIGS. 2 and 3, the collet 25 and tether 30 are preferably of molded, one-piece, plastic construction, the tether having a rectangular cross-sectional area with the narrow area-dimension disposed radially of the axis of the bore 26. Thus, with this configuration, the tether 30 is sufficiently flexible radially of the collet to permit its displacement into a storage position (see FIG. 2) and the tether is sufficiently rigid tangentially of the collet to permit the anchor 16 to be rotated on the screw 15 in response to rotation of the collet 25 thereon. An additional advantage is realized with the tether connected to the collet 25 at a distance from the bore 26 which is less than half the diameter of the aperture 13 and with the eye 31 being formed at the end of the arm 17. In this manner, the greatest amount of torque may be applied to the anchor to prevent it from rotating when its cooperating screw is rotated. Thus, rotation of the anchor behind the wall may be arrested simply by pushing the collet into frictional engagement with the front of the wall, or if desired, the body of the collet may be dimensioned to fit snugly into the aperture to automatically prevent rotation of the anchor.

When it is desired to remove the hook 10 from the wall 11, the screw 15 is rotated in the counterclockwise direction until the yoke 19 of the anchor 16 disengages the end of the screw 15. As may be seen in FIG. 4, the screw 15 may then be withdrawn through the bore 26 in the collet 25, permitting the anchor 16 to dangle freely from the barbed end of the tether 30. The anchor 16 is removed from behind the wall 11 when an operator grips the collet 25 and pulls leftward on the collet, the torsion spring 20 cooperating with the arms 17 and 18 to maintain the arms in their entended position permitting the anchor to be withdrawn lengthwise through the aperture (see FIG. 5). The anchor 16 may then be reassembled with its screw 15 to thereby permit the blind fastener to be reused.

If desired, modified forms of collets 125 (FIG. 6) and 225 (FIG. 7) which are economical to manufacture may be employed in the present invention with satisfactory results. Similarly to the collet 25, the collets 125 and 225 each have wall-engaging portions or flanges 128 and 228 and central bores 126 and 226 respectively for receiving screws which carry respective anchors. Each collet 125 and 225 has a body portion adapted to extend forwardly along a screw for engaging in an aperture to center the screw therein, the collet 125 having a hollow cylindrical body 127 and the collet 225 having a pair of centering body pins 250, 250. In addition, each collet 125 and 225 has a tether 130 and 230 extending forwardly therefrom and terminating in barbed heads 132 and 232 respectively for operatively engaging the anchor portion of a blind fastener. Each of these modified forms of collets is used in a manner similarly to that described heretofore which should now be apparent to one skilled in the art.

While preferred embodiments of the present invention have been described in detail, various modifications, alterations or changes may be made without departing from the spirit and scope of the present invention as defined in the appended claims.

I claim:

1. A blind fastener installed in an aperture in a wall having front and rear sides comprising: threaded means projecting through said aperture from said front side of the wall and having a head disposed on said front side, an anchor dimension to pass through said aperture and releasably threaded onto said threaded means, said anchor having a pair of arms pivotally carried by said threaded means and biased outwardly therefrom into a normally extended position to span across said aperture against said rear side of the wall upon insertion through said aperture, both of said extended arms having a free end portion for engaging against said rear side a spaced distance from said aperture, a collet carried on said threaded means to engage between said head and said front side of the wall, and a single tether projecting from said collet and extending through said aperture and including means connecting said collet to one of said arms at a location spaced inwardly from its free end a distance less than the minimum transverse dimension of said aperture, so that the anchor may be engaged against the rear side of the wall and the collet against the front side thereof when the threaded means is rotated in one direction, and the anchor may be disengaged from the threaded means to dangle freely on said tether adjacent said rear side of the wall when the threaded means is rotated in the opposite direction and is displaced frontward through said aperture, said anchor being dimensioned for withdrawal frontward through the aperture with the arms in the normally extended position and the tether-connected arm first passing therethrough after said threaded means has been withdrawn and the collet is displaced frontward from the wall.

2. A fastener according to claim 1 wherein said anchor has an eye reeciving said tether for sliding movement therethrough, and said tether has an enlarged head at the end thereof remote from said collet, whereby upon rotation of the threaded means and displacement of the anchor toward the collet and into engagement with the rear side of the wall, the tether slides through the eye into a storage position out of the operative path of the anchor.

3. A fastener according to claim 2 wherein said anchor has a pair of arms biased outwardly from said threaded means into a normally extended position to span across said aperture against said rear side of the wall upon insertion through said aperture with said eye being formed in one of said arms, said arms having a maximum dimension in a plane transverse to its direction of extension less than the minimum dimension of said aperture in a plane normal to its axis, whereby the anchor is prevented from being withdrawn through the aperture when connected to said threaded means but may be withdrawn lengthwise therethrough when the arms are in their extended position with the threaded means disconnected therefrom.

4. A fastener according to claim 3 wherein said arms are pivotally carried by a yoke threaded onto said threaded means with said arms having a U-shaped cross-section permitting them to pivot on said yoke into an internested relationship against said threaded means, whereby the arms may be folded against their bias into a slim profile permitting insertion through said aperture when connected to said threaded means.

5. A fastener according to claim 2 wherein said aperture is cylindrical and said collet has a bore for receiving said threaded means, said tether having a rectangular cross section with the narrow rectangle dimension disposed radially of said bore, the tether being flexible radially of the collet but substantially rigid tangentially of the collet to permit the anchor behind the wall to be positioned by rotating the collet on the front of the wall.

6. A fastener according to claim 5 wherein said eye is formed at the end of said one arm and said tether is connected to said collet at a distance from the axis of said bore which is substantially equal to half the diameter of said aperture, whereby a maximum amount of torque may be applied to the anchor through the tether to arrest rotation of the anchor behind the wall when the threaded means is rotated.

7. A fastener according to claim 5 wherein said tether is integral with said collet and said collet has body means extending axially of said bore to snugly engage in said aperture for centering said threaded means therein.

8. For a blind fastener having threaded shaft means threadedly mounting an anchor carrying opposite arms adapted in one position to be disposed along said shaft means to pass through an aperture in a wall and in another position to project transversely outwardly from said threaded shaft means and terminating in free end portions a spaced distance therefrom to operatively engage a side of the wall adjacent said aperture, a collet having a bore slidably receiving said threaded means and an abutment extending radially outward from the axis of said bore to engage the opposite side of the wall adjacent said aperture, a single elongated flexible tether projecting axially of said bore, said collet and tether being of molded one-piece construction and said tether having a barbed head integral therewith on its free end remote from said collet, said barbed head having a flexible portion extending outwardly from said tether to cause said head to have a normal transverse dimension greater than the dimension of said arm-aperture, said flexible portion tapering forwardly and being resiliently deformable inwardly toward said tether to permit said head to be inserted axially forward through said arm-aperture, said flexible portion being resiliently deformable outwardly of said tether upon insertion through said arm-aperture to engage around said arm-aperture and prevent rearward disengagement therefrom.

9. Apparatus according to claim 8 wherein said collet has a cylindrical body portion extending axially along said bore from said abutment, and said tether projects axially from said body portion.

10. Apparatus according to claim 9 wherein said tether is flexible radially of said body portion and is substantially inflexible tangetially thereto.

11. Apparatus according to claim 9 wherein said abutment is a circular flange extending radially outward from the periphery of said cylindrical body portion.

12. Apparatus according to claim 9 wherein said cylindrical body portion has an annular recess extending inwardly from the end thereof remote from said abutment.

13. Apparatus according to claim 8 wherein said tether is integral with said abutment a spaced radial distance from the axis of said bore, and said abutment has a plurality of pins projecting axially therefrom in a circle described around said axis at said radial distance.

References Cited

UNITED STATES PATENTS

| | | | |
|---|---|---|---|
| 2,024,871 | 12/1935 | Parsons. | |
| 2,147,950 | 2/1939 | Murphy | 85—3 |
| 2,998,743 | 9/1961 | Apfelzweig | 85—3 |
| 3,211,042 | 10/1965 | Fischer | 85—3 |
| 3,285,118 | 11/1966 | Elkins | 85—3 |
| 2,565,391 | 8/1951 | Molat. | |
| 2,950,141 | 8/1960 | Koff. | |
| 3,288,014 | 11/1966 | Mortensen | 85—3 |

EDWARD C. ALLEN, Primary Examiner

UNITED STATES PATENT OFFICE
CERTIFICATE OF CORRECTION

Patent No. 3,513,746        Dated May 26, 1970

Inventor(s) Raynor Morgan Forsberg

It is certified that error appears in the above-identified patent and that said Letters Patent are hereby corrected as shown below:

Column 3, line 26, "interested" should be --internested--;
Column 3, line 29, "arm" should be --arms--; column 4,
line 31 "aperture" should be --arm-aperture--; Column 5,
line 74, claim 2, "reeciving" should be --receiving--;
Column 7, line 3, claim 10, "tangetially" should be
--tangentially--.

SIGNED AND
SEALED
SEP 15 1970

(SEAL)
Attest:

Edward M. Fletcher, Jr.
Attesting Officer

WILLIAM E. SCHUYLER, JR.
Commissioner of Patents